Sept. 23, 1930.  H. J. POEPPEL ET AL  1,776,597
SAUSAGE FILLING NOZZLE
Filed June 10, 1929

INVENTORS
HENRY J. POEPPEL
BENJAMIN HOWARD BLONDEAU
BY
James L. Girman
ATTORNEY

Patented Sept. 23, 1930

1,776,597

UNITED STATES PATENT OFFICE

HENRY J. POEPPEL AND BENJAMIN HOWARD BLONDEAU, OF SEATTLE, WASHINGTON

SAUSAGE-FILLING NOZZLE

Application filed June 10, 1929. Serial No. 369,816.

This invention relates to improvements in sausage making apparatus and more especially to the sausage filling nozzle employed therein.

The principal object of the invention is to provide a nozzle of this character embodying a means to prevent the sausage skin from adhering to the nozzle during the filling operation. By the use of this means a completed sausage can be produced more evenly packed than could have been produced heretofore with the devices now common in the art. With our improved nozzle a film of lubricant is applied between the sausage skin and the periphery of the nozzle thus permitting smooth advancement of the skin. Heretofore in all sausage making machines considerable difficulty has been experienced due to the skin adhering to the nozzle while being filled. Such adhering to the nozzle would cause the skin to pack unusually tight until sufficient pressure was built up within the sausage to pull the skin from the point of adherence, then during the remaining smooth advancement of the skin an even flow of meat into the sausage would occur. When finished, the sausage would therefore be tightly packed at one end and comparatively loosely packed for the remainder of its length.

With our improved form of nozzle we overcome all these objectionable features by providing a simple, efficient, durable and inexpensive device, properly lubricated to insure smooth advancement of the sausage skin over the nozzle with a resultant even distribution or packing of the meat within the sausage.

These and other objects will appear as our invention is more fully hereinafter described in the following specification, illustrated in the accompanying drawings and finally pointed out in the appended claims.

Figure 1:
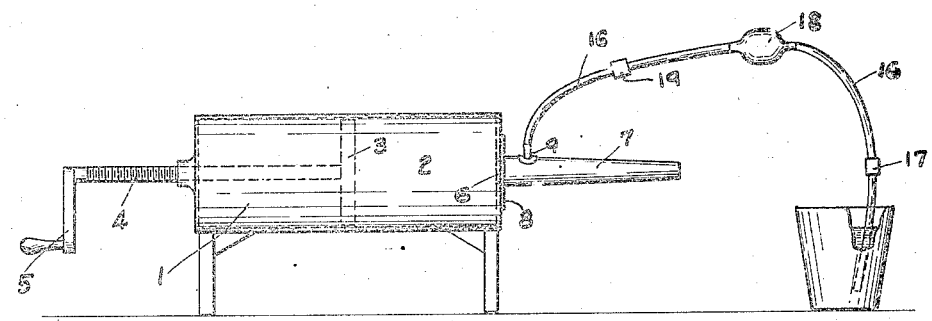
Figure 1, is a side elevation of any approved type of sausage machine showing our improved form of nozzle in operative engagement therewith.
Figure 2:
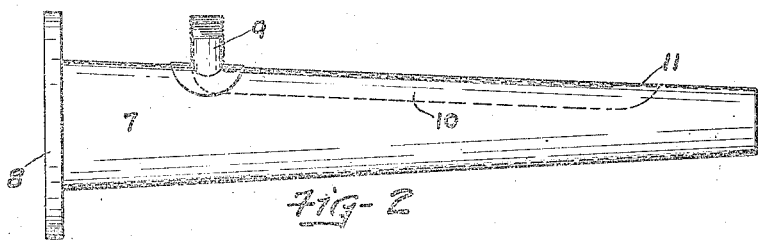
Figure 2, is an enlarged detail view of the nozzle.
Figure 3:
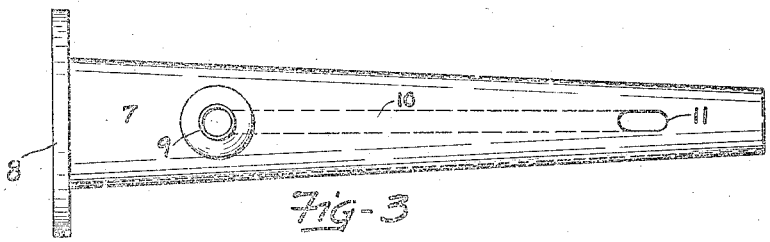
Figure 3, is a plan view of Figure 2.

Referring now more particularly to the drawings:

Reference numeral 1 indicates generally any approved type of sausage making machine having a hollow cylindrical body 2 with a piston 5 adapted to be advanced or retarded within the cylindrical body by any suitable means, such for instance as a threaded shaft 4 and handle 5. The opposite end of the body is formed with an outlet 6, adapted to receive the flanged end of our improved form of nozzle.

The nozzle consists of a hollow tapered cylindrical body 7, formed at one end with a flange 8. 9 indicates a threaded intake communicating with a tube 10 which extends to a point near the outermost end of the nozzle. At this point an elongated aperture 11 is provided. In the modified form shown in Figure 4, a round aperture 12 is positioned between a pair of flanges 13.

Figure 5:
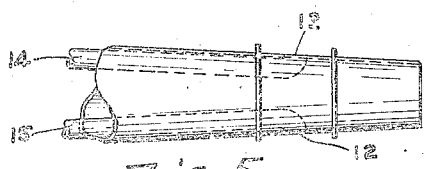
Figure 5, is a view similar to Figure 4 showing still another modified form of lubricating means.

In the form shown in Figure 5, an intake 14 and an outlet 15 is provided. The apertures also being positioned between the flanges.

In the operation of the machine, a hose 16 is connected with the intake 9. The opposite end of the hose is submerged in any suitable liquid, such as water or the like, and is provided with any suitable form of check valve 17. A pressure bulb 18 and another check valve 19 are interposed between the ends of the hose.

The check valves are of any approved type and are so arranged as to permit drawing water into the bulb and ejecting it through the check valve 19, thence into the intake 9.

During the sausage filling operation, the sausage skin is first drawn over the nozzle. The handle 4 is then rotated to advance the piston 3 which forces the meat content of the cylindrical body through the opening 6, through the nozzle and into the sausage skin. As the skin fills it is of course carried away from the end of the nozzle. During this operation water is fed through the elongated aperture 11 to the surface of the nozzle by applying pressure to the bulb.

Figure 4:
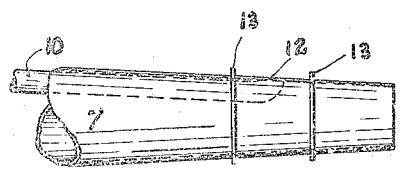
Figure 4, is a fragmentary view of the nozzle showing a modified form of lubricating means.

In the modified forms shown in Figures 4 and 5 the water is fed to the nozzle through the round apertures 12 between the flanges 13.

While we have shown a particular form of embodiment of our invention, we are aware that many minor changes therein will readily suggest themselves to others skilled in the art without departing from the spirit and scope of the invention.

Having thus described our invention, what we claim as new and desire to protect by Letters Patent is:—

1. A device of the class described comprising a nozzle, a fluid conveying means entering the nozzle near one of its ends and emerging near its opposite end.

2. In an article of the class described, the combination of a sausage filling nozzle, a means for lubricating the surface of said nozzle during the sausage filling operation, said means comprising a lubricant intake entering the nozzle near one end thereof and emerging near its opposite end.

In testimony whereof we affix our signatures.

HENRY J. POEPPEL.
BENJAMIN HOWARD BLONDEAU.